Patented Dec. 1, 1936

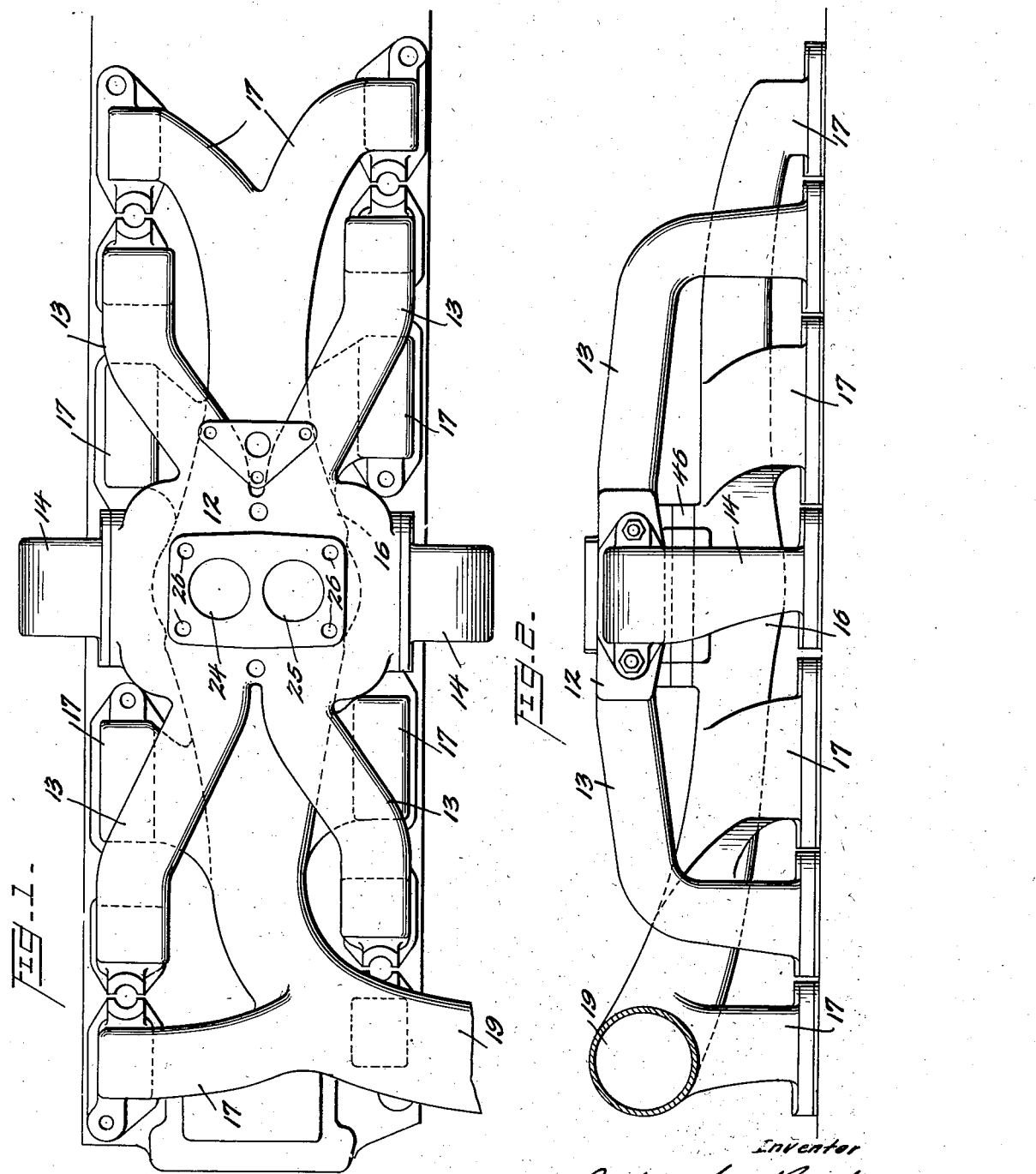

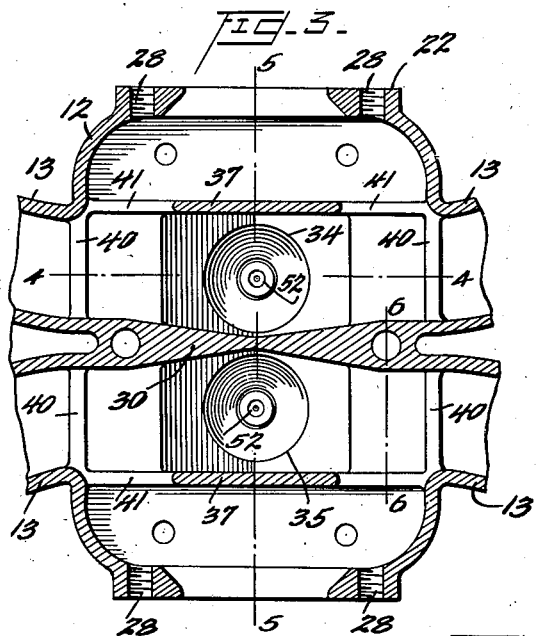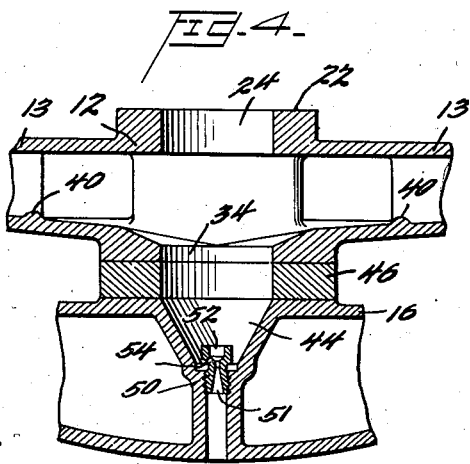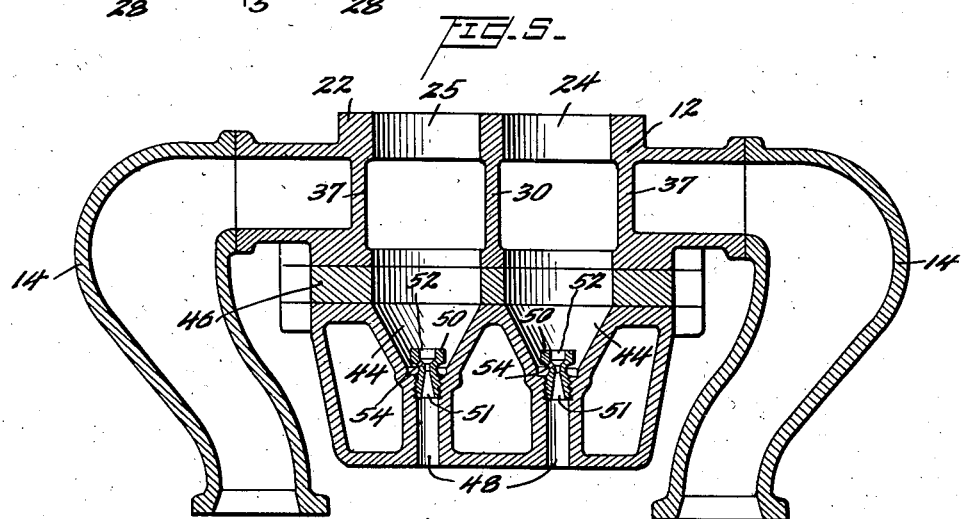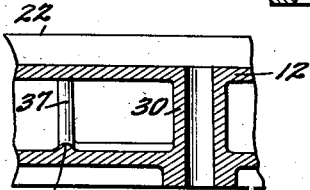

2,062,433

UNITED STATES PATENT OFFICE 2,062,433

INTERNAL COMBUSTION ENGINE

Cornelius W. Van Ranst, Detroit, Mich., assignor to Packard Motor Car Company, Detroit, Mich., a corporation of Michigan Application March 21, 1932, Serial No. 600,348

9 Claims. (Cl. 123—52)

This invention relates to internal combustion engines and has for its object the provision of means for insuring delivery of a combustible mixture of fuel and air to the engine in proper condition and proportions over a widely varying range of temperatures.

It is a feature of the invention that heat is supplied to the combustible mixture to insure vaporization of liquid fuel particles separated out from the mixture primarily when conditions are such as to favor separation of the fuel particles, namely, when the engine is operating at a temperature lower than the normal running temperature, the supply of heat being discontinued when the normal temperature is reached.

It is a further object of the invention to provide a depression or well in the intake manifold adjacent to and below the port through which the combustible mixture of liquid fuel and air is introduced into the manifold, whereby liquid fuel particles separating out from the mixture may be collected in the well, and means for atomizing the liquid fuel thus collected to insure return thereof in finely divided form to the fuel stream.

It is a more specific object of the invention to provide an intake manifold suitable for use with engines employing down draft carburetion, a collecting chamber being associated with the manifold for receiving liquid fuel particles separated out of the mixture, and means for heating and atomizing the separated liquid fuel. In the preferred form of the invention, the exhaust manifold is provided with an exterior depression in the wall thereof serving as a well for the liquid fuel, and the intake manifold communicates with this well through a passage which includes a heat insulating device interposed between the manifolds, whereby heat may be supplied to the fuel well for vaporizing the fuel while the engine is cold without affecting the temperature of the manifold and the combustible mixture flowing therein when the engine attains normal operating temperature.

Further objects and features of the invention will be apparent from the following description taken in connection with the accompanying drawings, in which Figure 1 is a plan view of an intake and exhaust manifold construction embodying the principles of the invention;

Figure 2 is a side elevation of the construction shown in Figure 1;

Figure 3 is a horizontal section through the central portion of the intake manifold shown in Figures 1 and 2;

Figure 4 is a partial sectional view taken on the line 4—4 of Figure 3;

Figure 5 is a section on the line 5—5 of Figure 3; and

Figure 6 is a section on the line 6—6 of Figure 3.

In order to facilitate an understanding of the invention, specific language is used hereinafter in describing the preferred arrangement shown in the drawings. It will nevertheless be understood that no limitation of the scope of the invention is intended thereby and that various changes and alterations are contemplated. For instance, the invention has been shown as applied to an engine employing a twin carburetor of the down draft type, but it will be apparent that the use of this type of carburetor is not essential to the invention.

Referring to Figures 1 and 2 of the drawings, it will be observed that in the preferred arrangement the intake manifold 12 having the branches 13 extending generally longitudinally of the engine and fore and aft of the central portion of the manifold and the laterally extending branches 14, is located for the most part above the exhaust manifold 16. The exhaust manifold similarly comprises a plurality of branches 17 extending generally longitudinally of the engine, these various branches discharging through a common exhaust passage 19 at the rear of the engine.

The manifold shown in the drawings is adapted for use with an engine having upwardly directed inlet and exhaust ports located substantially in the same plane, the two manifolds being seated on and secured to the engine block with the various ports therein communicating with the corresponding ports in the engine. For instance, the engine may be of the V type having twelve cylinders, the manifolds being arranged between the two banks of cylinders, each of the branches 13 and 14 of the intake manifold delivering fuel mixture to two adjacent cylinders, the two centrally disposed branches 17 of the exhaust manifold each receiving exhaust gas from two cylinders and the end branches 17 each receiving exhaust gas from one cylinder. The central portion 12 of the intake manifold is provided with a flat seat 22 on which a carburetor, not shown, having ports arranged to communicate with the ports 24 and 25, is bolted, threaded openings 26 being provided in the manifold for this purpose.

Figure 3 shows clearly the construction of the central portion of the intake manifold, it being observed that the laterally extending branches 14 of the manifold may be formed separately and bolted thereto, threaded openings 28 being provided on each side of the manifold for this purpose. The several branches of the intake manifold are separated by a central partition 30 which serves to isolate the two portions of the manifold feeding the respective banks of cylinders on each side of the longitudinal axis of the engine. Directly beneath the ports 24 and 25 the manifold is provided with openings 34 and 35 respectively communicating with passages leading to liquid fuel wells hereinafter described. The combustible mixture enters the manifold through the ports 24 and 25 and passes longitudinally of the engine within the manifold, the portion of the mixture supplied to the branches 14 of the manifold being deflected by means of vertically disposed baffles 37 around which the mixture must pass in order to equalize to some extent the length of the path taken by the mixture in passing to the different cylinders. Thus when the engine is operating at normal temperature and the combustible mixture is substantially free of unvaporized liquid fuel, the main stream of the mixture passes downwardly into the manifold and longitudinally thereof above the openings 34 and 35, these openings performing no useful function. When, however, the temperature of the motor is below the normal operating temperature and complete vaporization of the liquid fuel cannot be effected by the carburetor, liquid fuel particles will fall out of the main stream of combustible mixture through the openings 34 and 35. The removal of unvaporized liquid fuel from the combustible mixture and the discharge thereof through the openings is further facilitated by the provision of ribs 40 at each side of the central portion of the manifold extending across the longitudinal branches thereof, the lower wall of the manifold sloping downwardly from these ribs toward the openings 34 and 35 as shown more particularly in Figure 4 of the drawings, and by ribs 41 aligned with the baffles 37 and extending across the path of the fuel mixture delivered through the branches 14.

It will be observed that the exhaust gas from the forward cylinders passes beneath the central portion of the intake manifold in flowing toward the exhaust passage 19, and this exhaust gas is utilized to supply heat to effect vaporization of the liquid fuel separated out from the combustible mixture. Thus, as shown in Figure 5 of the drawings, the upper wall of the exhaust manifold is formed exteriorly with two depressions or wells 44, one of these wells being located directly beneath each of the ports 24 and 25 through which the mixture is introduced into the manifold. The passage between the manifold and the wells 44 preferably includes a relatively thick gasket 46 of heat insulating material, the two manifolds being bolted together with the gasket interposed therebetween, so that direct transfer of heat from the exhaust manifold to the intake manifold is definitely prevented. It is found that with this construction the intake manifold can be maintained at an unusually low temperature regardless of its proximity to the exhaust manifold at the central portion of the engine. At the same time, when the motor is operating at subnormal temperatures, the necessary heat to vaporize separated liquid fuel is directly supplied to the fuel as it falls in the wells 44.

When the motor is first started in cold weather, prompt vaporization of liquid fuel particles cannot be insured by this arrangement, and it is found that a considerable amount of liquid fuel collects in the wells. In order to assist in the dispersion of this fuel and its return to the main stream of the fuel mixture, air is admitted to each well for the purpose of atomizing the fuel in an upward direction. For this purpose air passages 48 are provided, these passages extending through the exhaust manifold and being open at their lower ends. The upper end of each passage is preferably threaded to receive a nozzle 50, each nozzle having an air passage 51 extending therethrough and terminating in an upwardly directed cup portion 52. Laterally extending passages 54 are provided in each nozzle communicating with the interior of the cup portion 52 thereof adjacent the upper end of the passage 51 and with the interior of the well 44 adjacent the bottom thereof.

When sufficient liquid fuel has collected in either well to the level of the laterally extending passage 54, an atomization of the excess accumulated fuel will be effected, and the spray of fuel will be injected into the main mixture stream, such portion of the sprayed fuel as is not assimilated by the stream and carried to the cylinders being returned to the well in the manner hereinbefore described. It will be understood that the air used for atomizing the fuel is drawn in as the result of the low pressure normally existing in the intake manifold, the quantity of air introduced through the passages 48 and 51 either being insufficient to affect the richness of the mixture or being readily compensated for in other ways.

The arrangement affords a convenient and efficient manifold construction and is entirely automatic as regards the vaporization of liquid fuel particles, the heating and atomization of the particles occurring only under conditions necessitating further treatment of the mixture after it is delivered from the carburetor.

It will also be observed that the arrangement is such as to permit the discharge of an excess of liquid fuel particles from the vaporizing well through the passages 48, the point of communication of these passages with the well being sufficiently above the bottom of the well to permit of the retention of a considerable amount of liquid fuel which is vaporized by heat supplied from the exhaust gases or by atomization. Thus a considerable quantity of fuel which might be wasted if the passages 48 communicated with the bottom of the well is returned to the main stream in the form of completely vaporized fuel.

Having thus described the invention, what is claimed as new and desired to be secured by Letters Patent is:

1. In an internal combustion engine, the combination with an exhaust manifold, of an intake manifold having a port therein through which a combustible mixture of liquid fuel and air may enter, a well below the port for receiving unvaporized liquid fuel particles, said well comprising an external depression in the wall of the exhaust manifold, a passage extending through said manifold and discharging in said well for introducing a jet of air into said well to atomize liquid fuel collected therein, and heat insulating means interposed between said manifolds.

2. In an internal combustion engine, the combination with a fuel supply passage associated with the engine for delivering a combustible mixture of air and liquid fuel thereto, of an exhaust passage associated with the engine through which the products of combustion are discharged, and a passage communicating with said fuel supply passage and the exterior of said exhaust passage whereby heat may be supplied to the liquid fuel to insure vaporization thereof, said communicating passage including heat insulating means interposed between said fuel supply and exhaust passages.

3. In an internal combustion engine, the combination with an intake manifold having an upwardly facing opening serving as a port for the introduction of a combustible mixture of liquid fuel and air, of an exhaust manifold having a portion thereof extending beneath said intake manifold adjacent said opening, and means located beneath said opening and comprising a passage communicating with the interior of said intake manifold and the exterior of said exhaust manifold through which unvaporized particles of liquid fuel may fall, said passage including heat insulating means interposed between said manifolds.

4. In an internal combustion engine, the combination with an intake manifold having an upwardly facing opening serving as a port for the introduction of a combustible mixture of liquid fuel and air, of an exhaust manifold having a portion thereof extending beneath said intake manifold adjacent said opening, said portion of the exhaust manifold having a depression exteriorly thereof comprising a fuel well, a passage connecting the intake manifold and said depression whereby unvaporized liquid particles may fall through said passage into said well, and heat insulating means interposed between said manifolds and forming a portion of said passage.

5. In an internal combustion engine, the combination with an intake manifold having a supply port and laterally extending branches communicating with the engine for delivering a combustible mixture of liquid fuel and air to the engine, said manifold having a well therein to receive unvaporized fuel particles, of means for supplying heat to said well to vaporize the liquid fuel therein, said manifold having a portion of the bottom wall thereof intermediate the supply port and the engine provided with a rib extending transversely of the path of flow of the mixture for retarding the movement of unvaporized particles of liquid fuel, said wall sloping downwardly from said rib to said well to return liquid fuel thereto.

6. In an internal combustion engine, the combination with an intake manifold, of an exhaust manifold, and a passage communicating with the interior of said intake manifold and a portion of the exterior of said exhaust manifold, said portion of the exhaust manifold exterior being depressed to form a pocket for the collection of unvaporized fuel, and means for spraying in the direction of said communicating passage the fuel collected in said pocket.

7. In an internal combustion engine, the combination with an intake manifold having a downwardly directed inlet passage, of an exhaust manifold, and a passage communicating with the lower end of said inlet passage and with a portion of the exterior of said exhaust manifold, said portion of the exhaust manifold exterior being depressed to form a pocket for the collection of unvaporized fuel, and means for spraying in the direction of said communicating passage the fuel collected in said pocket.

8. In an internal combustion engine, the combination with an exhaust manifold, of an intake manifold having a port therein through which a combustible mixture of liquid fuel and air may enter, a well below the port for receiving unvaporized liquid fuel particles, said well comprising an external depression in the wall of the exhaust manifold, and heat insulating means interposed between said manifolds.

9. In an internal combustion engine employing down draft carburetion, the combination with an intake manifold having a port in the upper wall thereof for receiving the combustible mixture of liquid fuel and air from the carburetor and laterally extending conduits for conveying the main stream of the mixture from the port to the engine, said manifold having a depressed portion in the lower wall thereof beneath said port in which unvaporized fuel particles may collect, a vent to the atmosphere communicating with said depressed portion above the bottom of the latter to permit discharge therefrom of unvaporized liquid fuel in excess of a predetermined quantity, and means for contacting exhaust gases with said depressed portion to heat the latter to vaporize the fuel therein.

CORNELIUS W. VAN RANST.